Patented Feb. 26, 1952

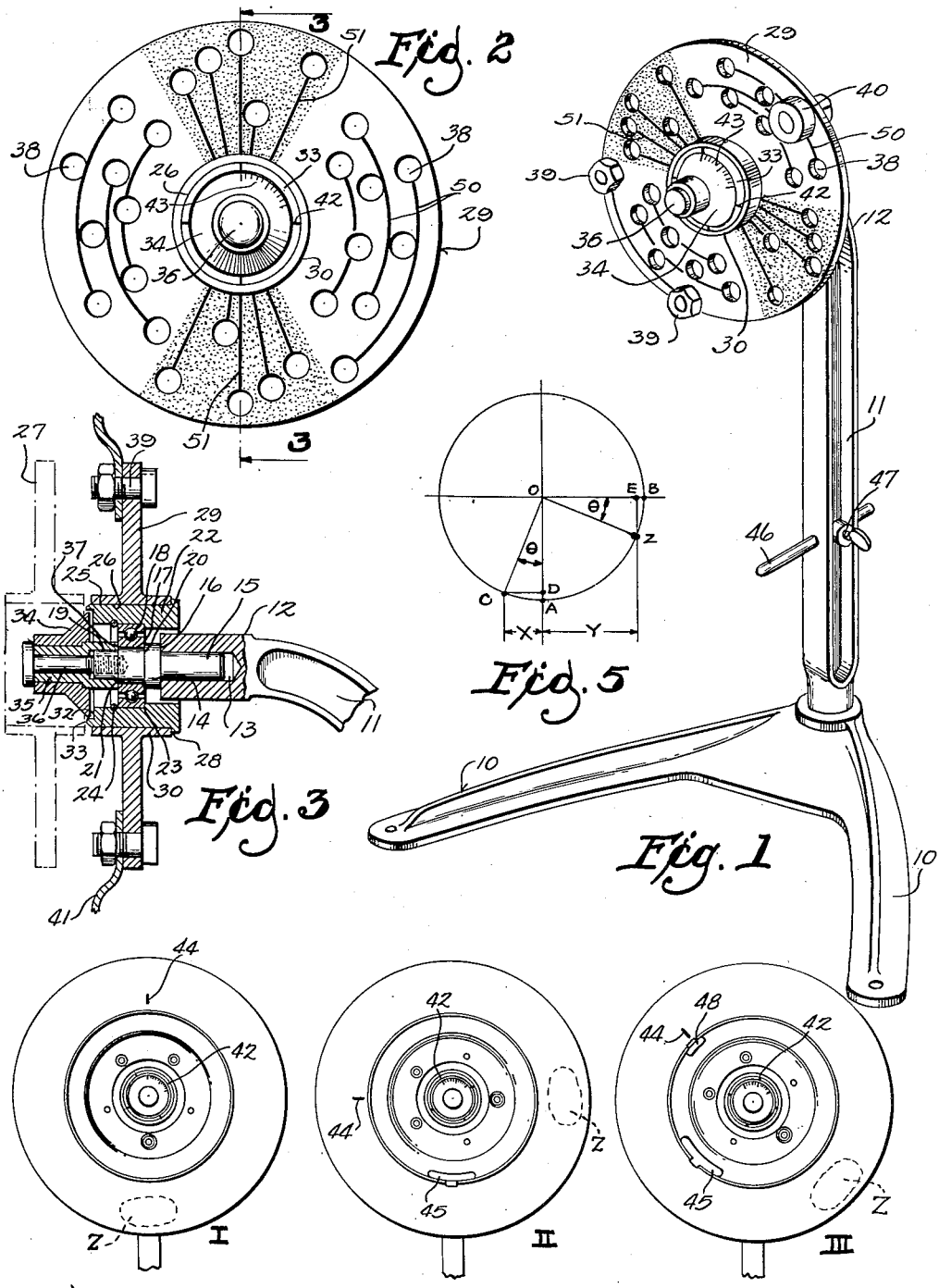

2,587,402

UNITED STATES PATENT OFFICE 2,587,402

WHEEL BALANCER

Homer J. Steel, Milwaukee, Wis.

Application March 25, 1949, Serial No. 83,381

4 Claims. (Cl. 73—66)

This invention relates generally to improvements in static wheel balancers, and more particularly to an apparatus for determining the amount and location of the mass unbalancing the wheel.

Methods heretofore employed, and apparatus designed for the execution of such methods, in the static balancing of wheels, such as automobile wheels or the like, have been largely confined to "cut and try" procedures. It is the principal object of this invention to provide apparatus for determining the quantity and position of wheel unbalance.

Other objects of the invention are to speed the wheel balancing operation and to provide means whereby an inexperienced operator may reach satisfactory balancing results immediately.

A still further object of the invention is to provide a wheel balancer that is simple in construction so as to be commercially available at a relatively low cost, and yet which is of such high sensitivity as to meet the demand for a precision instrument of its type.

Other objects will be more apparent from an examination of the following disclosure.

In the drawings:

Fig. 1 is a perspective view of the assembled wheel balancer.

Fig. 2 is a side elevational view of the rotating portions of the balancer showing the arrangement of the mounting disk and dial.

Fig. 3 is a cross sectional view taken along the line 3—3 of Fig. 2 and showing the balancer bearing and associated elements.

Fig. 4 illustrates the various steps of the method of utilizing the wheel balancer to determine the amount and location of the mass causing wheel unbalance.

Fig. 5 is a diagrammatic view showing the derivation of the formula and table whereby the angular distances between the dial calibrations may be computed with relation to a predetermined standard balancing weight.

The wheel balancer is designed to be mounted upon a work bench or the like by means of a mounting pedestal which comprises triangularly disposed feet 10, upright support column 11 and curved arm 12 which projects horizontally from the column above the feet and midway between the feet. The arm 12 is provided with an axial bore 13. The rotating parts of the balancer are mounted on a multi-surfaced axle shown generally at 14, which is provided with a reduced portion 15 pressed into binding engagement within the bore 13 of arm 12. The principal surfaces of axle 14 are a shoulder 16 which defines the limits of entry of reduced axle portion 15 into bore 13, a bearing surface 17 upon which the inner race of ball bearing 18 is fixed and an internally threaded portion 19. The axle is further provided with shoulders 20 and 21 which define the width of bearing surface 17 and perform assemblage functions to be hereinafter described more in detail.

The ball bearing 18 rotatably carries a hub 22 which is securely seated on the outer race of the ball bearing, between an internal shoulder 23 of the hub and a retainer ring 24 in the hub to permit the hub 22 to rotate upon the axle with relatively little friction therebetween. The external periphery 25 of the hub is finished for fitted sliding contact with an internally finished axial bore 26 of a mounting disk which comprises an annular flange portion 29 carried on a hub 30. The relative dimensions of these fitted surfaces are such that while positive contact is effected between surface 25 and 26, the disk may nevertheless be manually pressed on the hub, as from the dotted line position 27 to the full line position in Fig. 3. External shoulder 28 of hub 22 serves to accurately align the mounting disk with ball bearing 18.

The hub 22 is further provided with an undercut end margin 32 to present a peripheral flange 33. Operatively positioned within the undercut portion of the hub end margin is dial 34 which is rotatably mounted on sleeve 35. Sleeve 35 is telescopically received about internally threaded portion 19 of axle 14 and is fixed relative thereto by means of the threaded bolt 36. The internal diameter of the dial 34 is so related to the external diameter of the sleeve 35 that dial 34 is fixed relatively to shaft 35 normally, but may be manually rotated thereupon to a variety of selected fixed positions. It is to be noted that end margin 37 of sleeve 35 positively positions ball bearing 18 against axle shoulder 20 and abuts axle shoulder 21, an annular channel being formed therebetween in which the inner race of ball bearing 18 is seated.

The annular flange 29 of the mounting disk is provided with a plurality of through openings 38 which are so oriented on the flange 29 as to provide combinations of holes registering with the bolt circle holes of a variety of automobile wheels. The registration need not extend completely around the bolt circle as, for balancing purposes, a three bolt support is adequate for a bolt circle containing an odd number of holes, and a two bolt support is adequate for a bolt circle containing an even number of holes. Bolts 39 and a bolt 40 are provided for interchangeable mounting use with a variety of wheels and the appropriate through openings 38 of the mounting disk. Bolts 39 are of equal weight and bolt 40 is of greater weight than either of bolts 39. Where two bolts only are needed, bolts 39 are used and are diametrically oppositely disposed on the wheel bolt circle. When three bolts are needed heavy bolt 40 is so positioned in the triangular arrangement as to compensate for the unbalance introduced into the system by the asymmetrically disposed bolts. Fig. 3 illustrates fragmentarily a wheel 41 supported on the mounting disk by oppositely disposed bolts 39 in a two bolt arrangement.

To facilitate the registration of the bolt circle holes with the through openings in the mounting disk, the annular flange 29 of the mounting disk is divided into four sectors. In two oppositely disposed sectors through openings 38 are arranged arcuately about the central hub 30 on a series of different diameters, and the mounting disk is scored with arcuate lines 50 intersecting the openings to indicate their arcuate disposition with respect of the similar openings in the oppositely disposed sector. This arrangement facilitates the positioning of the three bolt system wherein two bolts are disposed on the same arcuate line. In the other two sectors, the flange surface defined thereby being etched or otherwise of contracting appearance to that of the first two sectors, the openings 38 are arranged radially on different diameters and the disk surface is scored with radial lines 51 which intersect the respective openings disposed on the same radius. This arrangement facilitates bolt positioning in the two bolt system wherein the bolts are diametrically opposed.

The flanged portion 33 of the hub 22 is provided with reference marks 42 spaced thereabout. The dial 34 is provided with lines of calibration shown generally at 43 in Fig. 2. The manner of computing the angular distances between the lines of calibration will be hereinafter more fully described. As the dial 34 is fixed with respect to the mounting disk, rotational movement of the disk will cause the reference marks 42 to move relative to the calibrations 43 of the dial. Furthermore, as the disk 34 is impositively fixed on sleeve 35, said dial may be rotated on said sleeve for the purpose of properly orienting the calibrations with the reference marks in the execution of the wheel balance method about to be described.

The operation of the wheel balancer proceeds as follows. The mounting disk may be slidably removed from the hub 22 (as illustrated in Fig. 3) for the more convenient affixation of the disk to the wheel and tire about to be balanced. The wheel and its tire will normally be laid flat on the floor. The mounting disk is then positioned over the bolt circle keeping the guide markings in sight and matching the through openings in the disk with the bolt holes in the wheel. The mounting bolts are then inserted through the proper holes in the wheel and nuts are applied thereon. It is not necessary to use a wrench in the tightening process as manual tightening with the fingers is quite sufficient to hold the wheel and tire to the mounting disk for balancing purposes. The mounting disk with wheel and tire is now slidably engaged with the hub 22 and after proper seating against hub shoulder 28 the mounted wheel is allowed to gravitate to a position of rest.

If an unbalance exists the heavy side of the wheel will assume a position vertically below the hub. By virtue of the ball bearing support the sensitivity of the balancer is of a high order and will render accurate results even at low ambient temperatures. Although other anti-friction bearings may be adapted for use with the balancer, it has been found that a ball bearing is the most reliable and consistent over a wide temperature range. If a substantial unbalance is indicated all old weights are removed and a reference mark shown at 44 in position I in Fig. 4 is chalked on the tire. The wheel is now rotated 90° to the position shown at II in Fig. 4, this rotational movement resulting in the complementary shifting of the heavy unbalanced portion of the wheel to a similarly horizontal position.

The dial is now set to align an end calibration 43 with any one of the reference marks 42 on the flange 33 of hub 22. A known weight 45 is then pressed into binding engagement with the wheel at a point vertically below the hub (position II Fig. 4), and the wheel is again allowed to rotate freely until it comes to rest at position III in Fig. 4. The angular rotation of the hub with respect to the fixed dial is such that the reference marks 42 will now indicate the quantity of unbalance in units of weight on the calibrations of the dial.

It has been found convenient to use a 6 ounce weight for the standard 45. The angular distance between the individual lines of calibration 43 on the dial is carefully computed with respect to this selected standard so that each line represents 1 ounce of unbalance. The derivation of the formula and table by which this angular distance is computed is shown diagrammatically in Fig. 5. The circle represents the wheel. The point B represents the equivalent location of the mass causing unbalance. Point A represents the standard weight 45 which, for the purpose of this description, will be considered to be 6 ounces. The angle $\theta$ is that through which the wheel rotates as from position II to position III in Fig. 4, C now being the 6 ounce weight and Z the unknown unbalanced mass. Perpendiculars are now dropped from C to the radius OA and from Z to the radius OB, congruous right triangles OCD and OZE being thereby defined. The angle $\theta$ is of course the same in both triangles. The leg CD of triangle OCD may be conveniently represented by distance X and the leg OE of triangle OZE by distance Y.

Taking the moments of force about the point O, these being equal when the wheel is at rest:

$$6X = ZY$$

If the radial distance OC and OZ is taken as unity:

$$\sin\theta = CD = X$$

and $$\cos\theta = OE = Y$$

therefore by substitution:

$$6 \sin\theta = Z \cos\theta$$

and transposing:

$$\frac{\sin\theta}{\cos\theta} = \frac{Z}{6}$$

applying the familar trigonometric identities whereby $$\frac{\sin\theta}{\cos\theta} = \tan\theta$$

then $$\tan\theta = \frac{Z}{6}$$

thus a table may be developed whereby the angle $\theta$ which defines the angular distance between the lines of calibration 43 may be determined for any value of Z read in ounces, thus:

| Z in ounces | tan θ | | θ in degrees |
|---|---|---|---|
| 1 | 1/6 | .166 | 9°25' |
| 2 | 2/6 | .333 | 18°25' |
| 3 | 3/6 | .500 | 26°34' |
| 4 | 4/6 | .667 | 33°40' |
| 5 | 5/6 | .833 | 39°48' |
| 6 | 6/6 | 1.000 | 45°00' |
| 7 | 7/6 | 1.167 | 49°25' |
| 8 | 8/6 | 1.333 | 53°08' |
| 9 | 9/6 | 1.500 | 56°19' |
| 10 | 10/6 | 1.667 | 59°03' |
| 11 | 11/6 | 1.833 | 61°23' |
| 12 | 12/6 | 2.000 | 63°27' | and so on.

Of course the angular distance $\theta$ would have to be recomputed if the standard 45 were of any weight other than 6 ounces, however, the 6 ounce weight is completely adequate for all normal ranges of wheel unbalance. From the table it is seen that the dial markings comprising the calibrations are logarithmically disposed about the dial.

Furthermore it would be quite possible to apply the formula $$\tan \theta = \frac{Z}{6}$$

to arrive at the quantity of the mass causing wheel unbalance apart from the use of the calibrated dial by simply noting the angle $\theta$ through which the wheel rotates from position II to position III in Fig. 4 and performing the indicated operation to arrive at Z.

The dial reading then indicates the quantity of unbalance and the chalk mark 44 indicates the radial position on the rim at which the indicated weight must be added to bring the wheel into proper balance. Such corrective weight is shown at 48 in position III of Fig. 4. Of course the standard weight 45 must be removed in order to bring the wheel into perfect balance.

To eliminate the possibility of dynamic unbalance, weight 48 should be divided into two equal portions, one half being added to the outside periphery of the rim at the chalk mark and the other half to the inside periphery of the rim at the chalk mark. The balance may now be rechecked and a correction made if necessary. However such correction is rarely necessary in view of the high degree of accuracy of the initial balancing operation.

For the purpose of determining whether the wheel is crooked or warped, the column 11 is provided with a pin 46 adjustable through a thumb screw lock 47. The end of the pin is set close to the tire, the usual practice being to set the pin about one-fourth of an inch from the tire, and the wheel is then rotated slowly. Variations in the distance between the tire and the pin will indicate a warped or crooked wheel.

The wheel and tire having been statically balanced, the mounting disk with wheel and tire may be slidably removed from the hub 22 and the mounting disk unbolted from the wheel whereupon the balancer is ready for further use.

From the foregoing description taken in connection with the accompanying drawings it is seen that an improved method and apparatus has been provided for determining the amount and location of wheel unbalance. It is observed that by the use of this method and apparatus said unbalance may be quickly and accurately determined on the first try, thus speeding the operation, and by its simplicity enabling inexperienced personnel successfully to perform the operation without supervision.

I claim:

1. In a wheel balancer, the combination with a support stand having a horizontal shaft, of a wheel mounting disk having a hub rotatable on said shaft, said hub having a reference mark, and a dial impositively mounted on said shaft, said dial having graduations cooperable with the reference mark on the hub and the dial being rotatable respecting both the hub and the shaft, whereby the dial may be adjusted to any position of the hub reference mark and angular displacement of said hub with respect to said dial is measured by displacement of the reference mark over the graduations.

2. In a wheel balancer, the combination with a support stand having a hub rotatable on a horizontal axis, a wheel mounting disk having openings for interchangeable mounting alignment with the bolt circle apertures of a variety of wheels, said disk being detachably mounted on said hub, of a dial adjustably mounted on the stand in rotational relation to the hub, the hub being provided with a plurality of reference marks angularly spaced thereabout and the dial being provided with peripheral graduations cooperable with the hub reference marks and selectively registerable with any of the reference marks on said hub whereby to align the dial with one of the reference marks regardless of the initial positioning of the disk on the hub.

3. In a wheel balancer, the sub-combination of a horizontal axle, low friction bearing means on the axle, a rotatable hub mounted on said bearing means and having an end margin provided with a plurality of reference marks spaced peripherally thereabout, and a dial impositively mounted on the axle, said dial being selectively rotatable on the axle with respect to the axle and to the hub, said dial being provided with peripherally spaced graduations selectively registerable with any one of the reference marks on the rub, whereby to align the graduations of the dial with the hub reference marks regardless of initial misalignment therebetween.

4. The device of claim 3 in further combination with a wheel mounting disk detachably mountable on the hub said disk being provided with a plurality of spaced openings adapted for registration with complementary openings in the bolt circles of wheels to be balanced.

HOMER J. STEEL.

REFERENCES CITED

The following references are of record in the file of this patent:

UNITED STATES PATENTS

| Number | Name | Date |
|---|---|---|
| 1,977,297 | Weaver | Oct. 16, 1934 |
| 2,058,784 | Gibbons et al. | Oct. 27, 1936 |
| 2,478,477 | Graves | Aug. 9, 1949 |

FOREIGN PATENTS

| Number | Country | Date |
|---|---|---|
| 528,177 | Great Britain | Oct. 24, 1940 |
| 660,717 | Germany | June 1, 1938 |